United States Patent Office.

GEORGE SHOVE, OF YARMOUTH PORT, MASSACHUSETTS.

Letters Patent No. 101,775, dated April 12, 1870.

IMPROVEMENT IN ROOFING-TILES.

The Schedule referred to in these Letters Patent and making part of the same.

To all persons to whom these presents may come:

Be it known that I, GEORGE SHOVE, of Yarmouth Port, of the county of Barnstable and State of Massachusetts, have made a new and useful invention or Composition for Roofing, or various other purposes in the arts; and I do hereby declare the same to be fully described in the following specification.

The constituent parts of said composition are hydraulic cement, calcined plaster of Paris, and gelatine.

In making the composition, take one hundred pounds of the hydraulic cement, one hundred pounds of the plaster of Paris, and eight pounds of gelatine or glue, gum Arabic, or gum tragacinth, or starch may be substituted for the gelatine, but I prefer the latter.

These constitutents may be mixed with about eighty pounds of water, and thereby converted into a paste or dough, which, after being thus made, is to be molded into the shape of tiles or other articles, and should subsequently be dipped in melted asphaltum, bitumen, or rosin, in order to cover the surface or surfaces so dipped with a substance impervious to water.

I do not confine my said composition to the precise proportions of its constituents as stated, as they may be varied more or less without materially changing its character.

What I claim as my invention is—

The composition, made of the materials and in the manner, and covered by a water-proof protective matter, substantially as described.

GEO. SHOVE.

Witnesses:
R. H. EDDY,
S. N. PIPER.